United States Patent [19]

Roach

[11] Patent Number: 4,680,248

[45] Date of Patent: Jul. 14, 1987

[54] USE OF DESICCANT TO CONTROL EDGE FUSION IN DRY FILM PHOTORESIST

[75] Inventor: Donald J. Roach, Gloucester, N.J.

[73] Assignee: Hercules Incorporated, Wilmington, Del.

[21] Appl. No.: 767,210

[22] Filed: Aug. 19, 1985

[51] Int. Cl.[4] .......................... G03C 3/00; G03B 17/26

[52] U.S. Cl. .................................... 430/270; 430/271; 430/272; 430/273; 430/327; 430/501; 430/939; 354/275

[58] Field of Search ............... 430/270, 271, 272, 273, 430/327, 501, 939; 354/275

[56] References Cited

U.S. PATENT DOCUMENTS 3,867,153 2/1975 MacLachlan ........................... 430/9

4,239,849 12/1980 Lipson ................................ 430/281

4,293,635 10/1981 Flint et al. ........................... 430/271

OTHER PUBLICATIONS

Hercules Technical Information Bulletin AQM—10-1—D—dated 8/84—(p. 10).

*Primary Examiner*—Richard L. Schilling

*Attorney, Agent, or Firm*—Marion C. Staves; William E. Player

[57] ABSTRACT

Disclosed is a method for controlling edge fusion in a laminate of an aqueous developable photoresist composition sandwiched between a film support and a protective cover sheet comprising maintaining the relative humidity below about 20% in the environment surrounding the laminate, preferentially achieved by packaging the photoresist with a desiccant in a moisture proof container.

3 Claims, 1 Drawing Figure

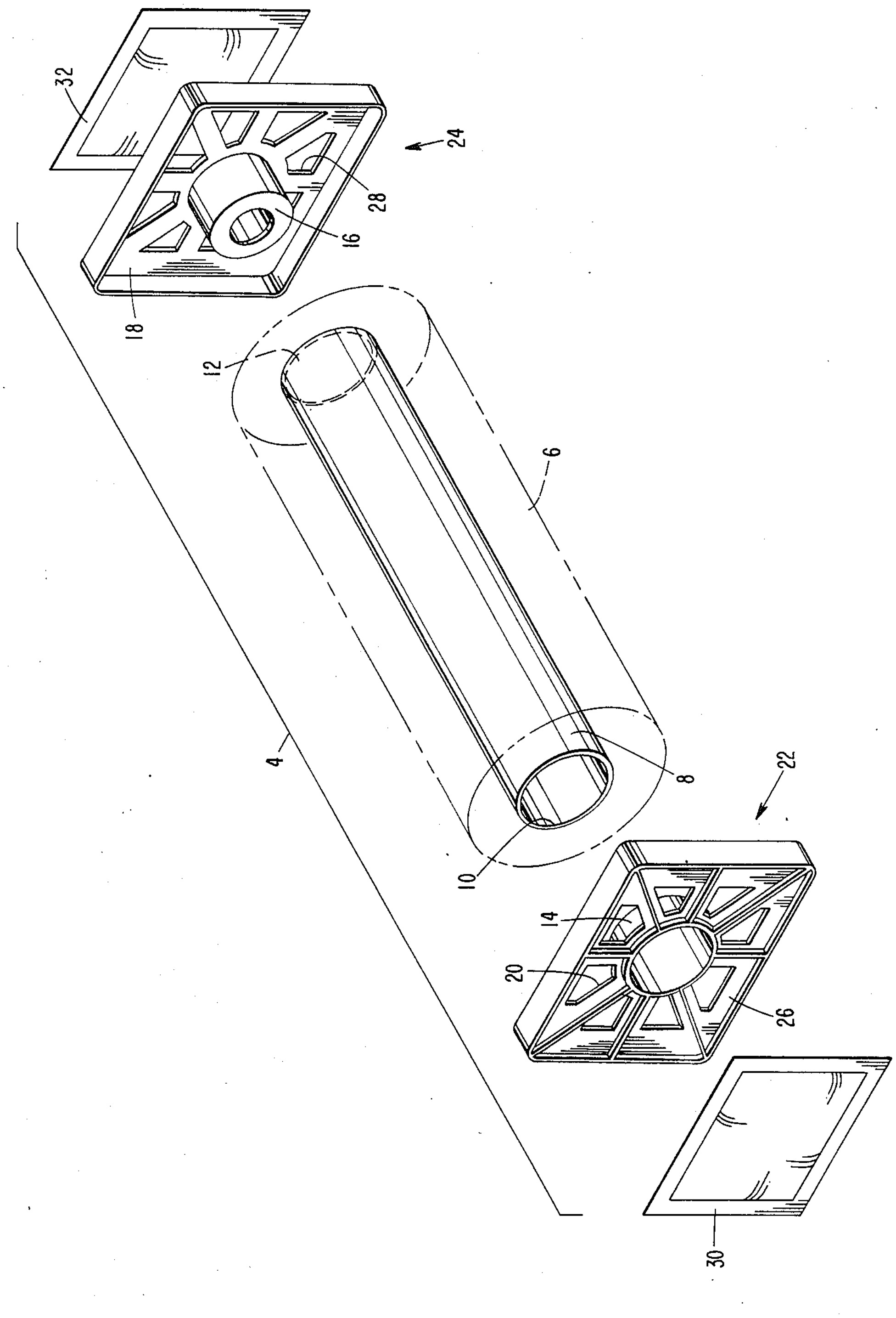
32
24
28
16
18
12
6
4
8
22
10
14
20
26
30

USE OF DESICCANT TO CONTROL EDGE FUSION IN DRY FILM PHOTORESIST

BACKGROUND OF THE INVENTION

This invention relates to the packaging and storing of aqueous developable photoresists. More particularly it relates to the reduction of edge fusion in packaged photoresists.

Aqueous developable photoresists are superior to non-aqueous developable resists, since aqueous developable photoresists employ water-base developing and stripping solutions, which avoid the environmental problems and high costs associated with the organic solvents and solvent additives needed to develop and strip non-aqueous resists.

Aqueous developable photoresists are typically packaged and stored in roll form as a laminate of the photoresist composition sandwiched between a flexible film support and a protective cover sheet. When packaged in this form the photoresist has a tendency to "cold flow". U.S. Pat. No. 3,867,153 hypothesizes that cold flow is caused by increases in temperature and/or pressure. Cold flow results in the photoresist oozing out from between successive layers of the film and cover sheet and fusing on the edge of the roll, a phenomenon known as "edge fusion". When an edge fused roll is unrolled, chips of the photopolymer may break off, and some of the film may delaminate from its support film, which interferes with proper imaging when the photoresist is exposed and developed. A fused roll is, therefore, defective and results in increased costs to either the user, who cannot use the defective portion of the roll, the seller, who must replace the defective roll, or both. Preventing edge fusion is, therefore, desirable in cost savings related to the use and sale of photoresist compositions.

Reducing edge fusion by reducing the temperature surrounding stored photoresists and by protecting the resists from direct pressure with improved packaging have not been completely successful, and are expensive.

Reducing edge fusion is claimed in U.S. Pat. No. 3,867,153 to have been achieved by irradiating the edges of the photoresist laminate and is also claimed by adding specific compounds to the photoresist composition as shown in U.S. Pat. Nos. 4,239,849 and 4,293,635. However, both of these methods have their disadvantages; significant cost increases in production result from using either method, and irradiating makes the photoresist in the radiation exposed edges hard and, therefore, useless for photoimaging.

SUMMARY OF THE INVENTION

According to the invention, edge fusion is controlled by maintaining the relative humidity below about 20% in the environment surrounding a roll or sheets of aqueous or semiaqueous developable photoresist laminate. A particularly useful and economical way to accomplish this is by packaging photoresist laminate rolls with a desiccant in a moisture proof container. This result is unexpected, as the art has never appreciated the part that moisture plays in cold flow and edge fusion.

DESCRIPTION OF THE DRAWING

Briefly, the drawing is an exploded view of a unit (4) that, when enclosed in a moisture proof container, exemplifies a preferred embodiment of this invention.

In detail, the unit (4) comprises: a roll of photoresist laminate sandwiched between a film support and a cover sheet (6) mounted on a cylindrical core (8) having openings (10, 12) at its opposing ends, into which openings (10, 12) are inserted bullets (14, 16) of sufficient dimension to provide a friction fit when inserted into said openings (10, 12) said bullets (14, 16) projecting from core support faces (18, 20) of perforated support members (22, 24) having desiccant support faces (26, 28) opposing said core support faces (18, 20) to which desiccant support faces (26, 28) there are attached, by appropriate known means, dessicant bags (30, 32).

DETAILED DESCRIPTION OF THE INVENTION

Aqueous developable photoresists in laminated roll or sheet form are maintained at below about 20% relative humidity in accordance with this invention by known methods of humidity control that will be apparent to those skilled in the art.

In a preferred embodiment of this invention, a desiccant is packaged in a moisture proof container with a laminated roll of photoresist. Various methods of packaging the roll with the desiccant will be apparent to those skilled in the art, such as for example, as shown in the Drawing.

Desiccant, formulations are well known, and any hygroscopic substance that does not adversely affect the photoresist is useable in accordance with the preferred embodiment. Examples of such substances are silica gel (including silica gel impregnated paper), calcium chloride, zinc chloride, calcium sulfate, montmorillonite, activated alumina, asbestos, charcoal, clay, glass wool, kieselguhr, barium oxide, calcium oxide, calcium bromide, zinc bromide, magnesium chlorate, copper sulfate, and Type 4A molecular sieves. Other suitable desiccants will be apparent to those skilled in the art. The desiccant used in the preferred embodiment is contained in a porous bag or net that allows moisture to pass through and contact the desiccant.

The amount of desiccant required in the preferred embodiment depends on such factors as the water absorbing capacity of the desiccant used, the packaging within which the desiccant and resist are stored, the humidity in the storage area, the projected storage time, etc. These and other factors are known, and the amount of desiccant needed in a particular application will be apparent to those skilled in the art.

The core on which the laminate is rolled in accordance with the preferred embodiment, as exemplified in the Drawing, is made from substances well known to those skilled in the art. Suitable cores are made from wood, metal or molded plastics, such as for example, polypropylene, polyethylene, ABS plastic, or any nondusting material.

The support members to which desiccant bags are attached in the preferred embodiment, as exemplified in the Drawing, are made from the same materials suitable for the cores. Preferably, the caps are large enough to extend beyond the edges of the roll. The two caps then form a support from which the roll is suspended in between. This protects the surface of the roll as well as the edges.

The moisture proof container used in the preferred embodiment is made from any nondusting material impervious to moisture that can also, preferably, protect the photoresist laminate from light and foreign matter, such as dust. Suitable materials are polyvinyl, polypropylene, ethylene propylene copolymer, cellophane, polystyrene, low density polyethylene, laminates of aluminum foil and polyethylene or polystyrene, etc. The container is preferably sufficiently opaque to protect the laminate from exposure to light. A particularly suitable container is a sealed, black, low density, polyethylene envelope. Other suitable materials will be apparent to those skilled in the art.

Those skilled in the art will be aware of other ways to package the desiccant with the photoresist laminate in accordance with the preferred embodiment. What is essential to the preferred embodiment is that the desiccant and photoresist roll be packaged together in a moisture proof container.

Whether using desiccant or some other known method of humidity control in accordance with this invention, humidity is maintained below about 20% in the area immediately surrounding the photoresist laminate.

The photoresist compositions that are protected in accordance with this invention are aqueous developable photoresists. The term "aqueous developable" means photoresists that can be developed by water base solvents, including what are sometimes referred to as semiaqueous solvents that contain small amounts of water miscible organic solvents, such as for example, a methyl, ethyl, or butyl ether of ethylene glycol or diethylene glycol, methanol, or ethanol. A particularly useful water based solvent is a dilute solution of sodium carbonate. Other developers are well known to those skilled in the art.

The photoresist compositions of the subject invention essentially comprise about 10–50, preferably 15–30, weight percent of one or more addition photopolymerizable monomers, about 35–80, preferably, 40–80 weight percent of a polymeric binder, about 0.001 to 10, preferably 0.01 to 5.0, weight percent of a free radical or photopolymerization initiator. In addition, minor amounts of background dyes, leuco (or printout) dyes, adhesion promoters, antioxidants, plasticizers, fillers, and the like may be optionally included.

The polymerizable monomer may have from 1 to 4, usually 1 to 3, preferably 2 to 3, addition polymerizable olefinic groups. Suitable monomers include the alkylene and polyalkylene glycol diacrylates prepared from alkylene glycols having two to fifteen carbon atoms or polyalkylene ether glycols of one to ten ether linkages. Outstanding monomers contain ethylenically unsaturated groups, especially vinylidene groups, conjugated with ester or amide structures. Especially preferred acrylyl compounds are triethylene glycol diacrylate, tetraethylene glycol diacrylate, pentaerythritol triacrylate, trimethylol propane triacrylate and pentaerythritol tetraacrylate. Other suitable monomers are disclosed in column 3 and 4 of U.S. Pat. No. 4,268,610 issued to L. Roos, incorporated by reference herein.

The polymeric binder determines whether or not the photoresist is developable in water based solvents. The presence of acid groups on the binder allows the photoresist to be so developed. Typical polymeric binders are shown in the U.S. Pat. No. 4,268,610 issued to L. Roos.

Thermal polymerization inhibitors are known to those skilled in the art as shown in the U.S. Pat. No. 4,268,610.

Photoinitiators used in the photoresist compositions are activatable by actinic light and are thermally inactive below about 185° C. Typical examples are shown in the U.S. Pat. No. 4,268,610.

Background and printout dyes may also be included in the photoresists usable in accordance with this invention. A background dye is a visible dye which provides good contrast on copper and serves as an indicator to insure removal of all the unexposed portions of the resist during the developing step. Blue and green dyes such as Brilliant Green and Victoria Blue or combinations thereof are particularly suitable for this purpose. A printout dye is initially colorless (leuco), developing color only upon irradiation by ultraviolet light. Some so called printout dyes are initially colored and fade upon irradiation. Printout dyes facilitate inspection of the patterned surface for imperfections, if any. However, the dyes must be inert towards the other components of the photoresist formulations and must not interfere with the photopolymerization process. Examples of such dyes are shown in U.S. Pat. No. 4,297,435, issued to J. L. Jolly, et. al., incorporated by reference herein.

Adhesion promoting agents include N-substituted benzotriazoles as described in the U.S. Pat. No. 4,268,610. Other adhesion promoting agents are known to those skilled in the art.

The flexible film support and the protective cover sheet between which the photoresist is sandwiched in the packaged roll are made from various materials well known to those skilled in the art. The film support preferably has a high degree of dimensional stability to changes in temperature and humidity. In general, the support has a composition such that there is only a moderate degree of adherence between the photoresist and the support. Suitable support films comprise many high polymer substances, such as for example, polyamides, polyolefins, polyesters, vinyl polymers, and cellulose esters and have a thickness of from about 0.00025 inch to about 0.008 inch. If the photoresist is to be exposed through the support film, the film must transmit a substantial amount of the actinic radiation used. If the film is to be removed, no such restrictions apply. A particularly suitable film is a transparent polyethylene terephthalate film having a thickness of about 0.001 inch. Suitable protective cover sheets are typically chosen from the same high polymer sustances used for the support film and have the same variations in thickness. A cover sheet comprising 0.001 inch thick low density polyethylene is particularly suitable. The photoresist layer sandwiched between the support and the cover sheet is generally about 0.0005 to about 0.004 inches thick. Specific applications require specific resist layer thicknesses that are known to those skilled in the art.

It will be apparent to those skilled in the art that the photoresist laminate can be packaged as sheets, as well as a roll, in accordance with this invention.

The following examples further illustrate the instant invention, but the invention is not limited thereto. All percentages are by weight unless indicated otherwise.

EXAMPLE 1

The following photoresist composition is mixed for one hour:

Acrylic copolymer (30% methyl methacrylate, 33% ethyl acrylate, 25% methacrylic acid, and 12% lauryl methacrylate, 50% by weight in methyl ethyl ketone, with a Brookfield viscosity of 4850 at 25° C.): 81.5 parts Tetraethyleneglycol dimethacrylate: 6.7 parts Trimethylolpropane triacrylate: 6.7 parts 2,6-di-tert-butyl p-cresol: 0.003 parts Benzophenone: 3.25 parts
Michler's ketone: 0.18 parts
Brilliant Green dye (Colour Index No. 42040): 0.002 parts
1,2,3,4,5-pentabromo-6-chlorocyclohexane: 0.80 parts
Leuco crystal violet: 0.45 parts In order to show the effect of moisture on the complex viscosity of photoresists, a dry film is formed by coating the composition onto a 0.92-mil sheet of biaxially oriented polyester film with the aid of a doctor blade to afford a film with a thickness of 0.00200-in. after drying at about 22° C. and 50% relative humidity overnight.

Forty layers of this dry film are laminated together with the aid of a Laminex laminator at about 43° C. (Sample A). An accurately weighed portion of the laminate is stored in a desiccator for 7 days over calcium sulfate (Sample B). At the end of this period, the sample shows an average weight loss of 1.05%. Another portion of laminate is similarly stored over water and gains 2.54% in weight (Sample C).

Upon subjecting Samples A, B and C to a frequency sweep in a mechanical spectrometer at 0.1 to 100 radians/sec at 60° C., the following complex viscosities are measured at 0.1 radians/sec:

Sample A, $1.0\times10^6$ poises
Sample B, $3.1\times10^6$ poises
Sample C, $2.3\times10^5$ poises When these samples are subsequently stored at 22° C. and 50% relative humidity for 7 days, they return to their original weights, within ±5%.

These results indicate that high humidity severely reduces the complex viscosity of this composition, whereas very low (or no) humidity raises its complex viscosity.

In order to show the effect of humidity on edge fusion, the photoresist composition is manufactured into mill rolls of dry film photoresist, slit into 12-in.×500-ft. rolls, and mounted on molded plastic end caps.

Two rolls of this film are stored horizontally at about 22° C. and 85% relative humidity, and two rolls were similarly stored at about 22° C. and 0-5% relative humidity. The rolls stored at 85% relative humidity showed signs of edge fusion within 7 days, whereas those stored at 0-5% relative humidity showed no evidence of edge fusion after 60 days.

The complex viscosity measurements and the edge fusion results show that, by decreasing the humidity, the tendency of the photoresist to flow and cause edge fusion is reduced.

EXAMPLES 2-7

To illustrate the use of desiccant to control edge fusion, rolls of dry film photoresist (1.5-mils; 18-in. ×500-ft.), on molded plastic cores prepared from the composition given in Example 1 are mounted on molded plastic end caps. Bagged desiccant, as described in Table I, is taped to a recessed area on the outside of the cap, with the holes in the molded cap permitting free air flow between the desiccant and the roll of film. Two bags of desiccant, one taped to each cap, are used. These are then packaged in 4 mil tubular, black, low density polyethylene, taped closed, stored horizontally in an oven maintained at 80% relative humidity and about 29° C., and periodically inspected for signs of edge fusion.

Two controls, one packaged without desiccant and the other not packaged, are similarly stored, and edge fusion results recorded.

A comparison of Examples and controls in Table I show that the use of desiccant significantly reduces edge fusion.

TABLE I

| Sample | Packaged | Desiccant | Amount of Edge Fusion Observed[a] 4 Days | 14 Days | 28 Days |
|---|---|---|---|---|---|
| Control 1 | No | None | 5 | 5 | 5 |
| Control 2 | Yes | None | 4 | 4 | 5 |
| Example 2 | Yes | Montmorillonite (1 oz. bags) | 1 | 1 | 2 |
| Example 3 | Yes | Montmorillonite (2 oz. bags) | 1 | 1 | 1 |
| Example 4 | Yes | Calcium sulfate (4 oz. bags) | 1 | 2 | 2 |
| Example 5 | Yes | Calcium sulfate (8 oz. bags) | 1 | 1 | 1 |
| Example 6 | Yes | Silica gel (2 oz. bags) | 1 | 1 | 2 |
| Example 7 | Yes | Silica gel (4 oz. bags) | 1 | 1 | 1 |

[a]Rank - ordered by appearance of edge fusion, as follows:
1 - none
2 - very slight
3 - slight
4 - moderate
5 - severe

EXAMPLES 8-13

Examples 2-7 are repeated, with the exception that the packaging material used is a laminate of 0.35-mil Al foil/1.5 mil low density polyethylene which is hermetically sealed. After 4-weeks at 80% relative humidity, 85° F., little or no edge fusion is observed. Desiccant used and edge fusion results are recorded in Table II.

TABLE II

| Example | Desiccant | Amount of Edge Fusion Observed[a] 4 Days | 14 Days | 28 Days |
|---|---|---|---|---|
| 8 | Montmorillonite (1 oz. bags) | 2 | 2 | 2 |
| 9 | Montmorillonite (2 oz. bags) | 1 | 1 | 1 |
| 10 | Calcium Sulfate (4 oz. bags) | 1 | 1 | 1 |
| 11 | Calcium Sulfate (8 oz. bags) | 1 | 1 | 1 |
| 12 | Silica gel (2 oz. bags) | 1 | 1 | 1 |
| 13 | Silica gel (4 oz. bags) | 1 | 1 | 1 |

[a]Rank - ordered by appearance of edge fusion, as follows:
1 - none
2 - very slight
3 - slight
4 - moderate
5 - severe

I claim:

1. An element comprising a laminate of an aqueous developable photoresist composition sandwiched between a film support and a protective cover sheet enclosed in a moisture proof container with an amount of dessicant sufficient to maintain the relative humidity below about 20% inside said container.

2. In a method comprising enclosing in a container a laminate of an aqueous developable photoresist composition sandwiched between supporting layers, the improvement comprising enclosing in the container an amount of desiccant sufficient to maintain the relative humidity inside the container below about 20%.

3. In an element comprising a laminate of an aqueous developable photoresist composition sandwiched between supporting layers enclosed in a container, the improvement wherein the element further comprises an amount of dessicant enclosed in the container sufficient to maintain the relative humidity inside the container at less than about 20%.

* * * * *